Oct. 29, 1940.     G. W. ASHLOCK, JR     2,219,832
CHERRY STONER
Filed May 15, 1940
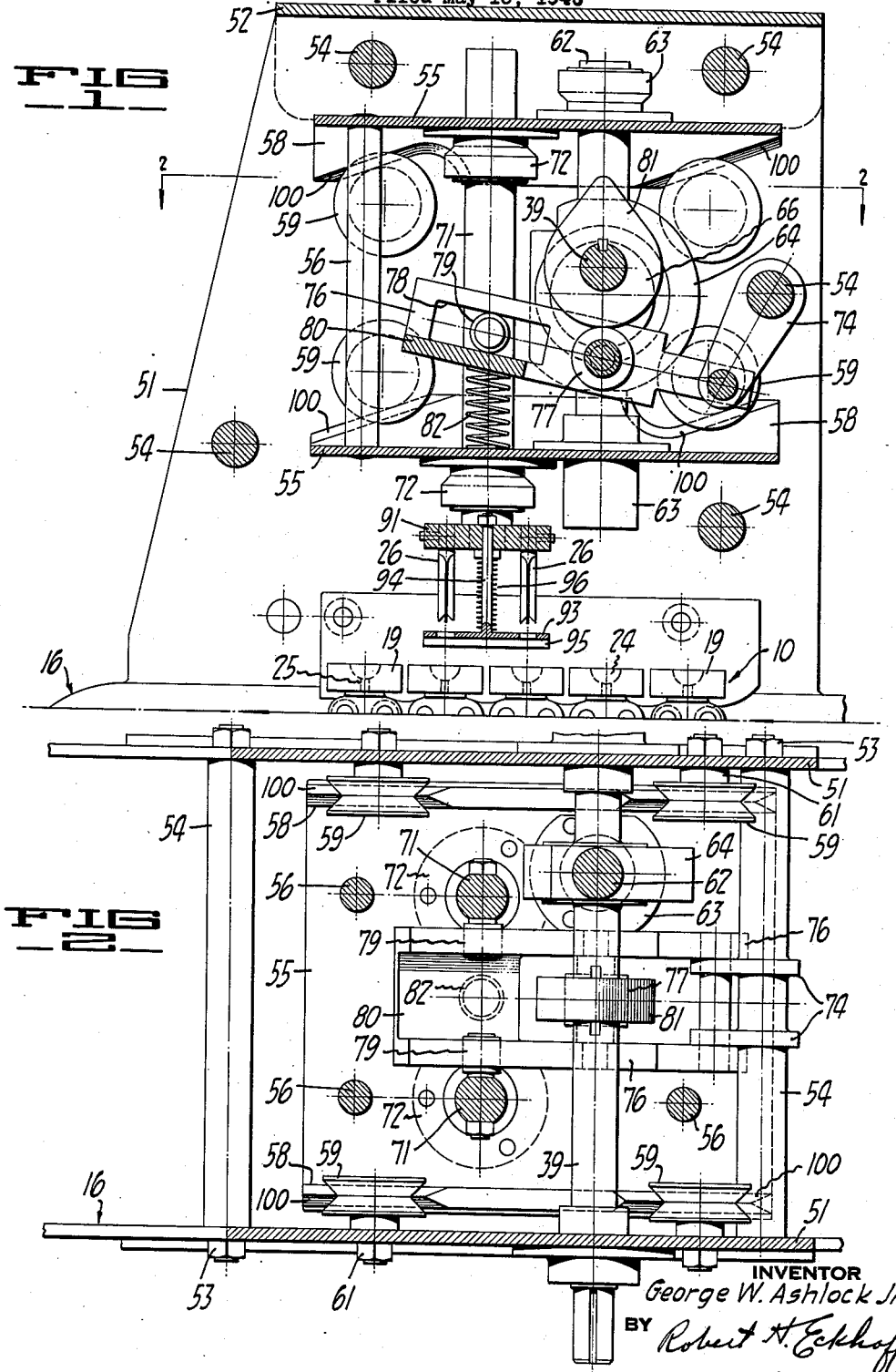
INVENTOR
George W. Ashlock Jr.
BY Robert H. Eckhoff
ATTORNEY Patented Oct. 29, 1940

2,219,832

UNITED STATES PATENT OFFICE 2,219,832

CHERRY STONER

George W. Ashlock, Jr., Oakland, Calif.

Application May 15, 1940, Serial No. 335,284

6 Claims. (Cl. 146—19)

This invention relates to a fruit pitting machine and particularly to a mechanism for pitting cherries, usually termed a cherry stoner. While the machine will be particularly described as it has been applied to the pitting of cherries, it will be obvious that by changing the pitting knives and fruit carrying receptacles the mechanism can be readily adapted for other fruits, for example, peaches, apricots and olives.

In my prior Patent 2,157,518 issued May 9, 1939, there was disclosed a machine adapted for the pitting of fruit. It included a continuously advanced conveyor in combination with a pitting mechanism which periodically followed the conveyor to pit fruit thereon. The fruit carrier structure extended horizontally for some distance in advance of the pitting mechanism to provide a work surface on which cherries could be spread and later straightened by hand.

Stoned cherries are ordinarily divided into two classes—pie cherries and those to be employed for the manufacture of fancy cherries such as maraschino cherries. The demand for the latter grade has increased in the last few years. Pie cherries are ordinarily fresh cherries pitted haphazardly, no attention being given as to whether or not the pit is ejected through the dimple or stem end of the cherry. A maraschino cherry, on the other hand, is a brined cherry. They are pitted with care, the pit being normally removed through the stem end of the cherry to cause as little rupture or break in the cherry as is possible. As is well known in the art, brined cherries, those stoned to provide maraschino cherries, are treated with a preservative solution. Brined cherries are much more brittle and harder than fresh cherries. Consequently, the manufacture of maraschino cherries presents certain unique problems.

With my prior machine when it was desired to produce the maraschino cherries, operators were stationed about the work table provided by the carrier to turn each cherry into position with its dimple or stem end down. This made the operation very expensive because about six operators were required to feed a machine at about its maximum operating rate, about 150 pitting operations per minute or 900 cherries.

Some time ago I introduced to the trade an automatic fruit straightener, particularly that disclosed in my Patent 2,212,892 issued August 27, 1940 (see also my Patent 2,213,893 issued September 3, 1940). This machine will straighten cherries effectively and at a high rate without any manual operation, the machine operating automatically in conjunction with the pitting mechanism disclosed in my aforementioned patent. Because of the efficient feed of cherries positioned with their dimpled end downwardly, efforts were made to speed up the machine of my prior patent and increase its operating rate. It will be recalled that in the machine of my prior patent I disclosed a relatively light head which was reciprocated back and forth horizontally in its superimposed position over the fruit carrier. Mounted upon this head for reciprocation was a suitable fruit pitting mechanism. The head was moved horizontally forward over the carrier at a rate such that the pitting mechanism was held superimposed over a selected carrier. While thus superimposed the pitting mechanism was lowered to engage and pit fruit on the carrier, thereafter being raised out of engagement whereupon the head was returned to a point of beginning from which it was again moved forward over another carrier. I have now discovered that by moving the head or guideway for the pitting mechanism forward in direction of advance of the carrier and, at the same time, advancing the guideway downwardly toward the carrier, thereafter operating the pitting mechanism to pit fruit on the carrier, the rate of operation of my prior machine can be increased by nearly 100%, that is, 225 and more pitting operations (1350 cherries) can be performed with ease whereas previously 150 pitting operations was about the practical maximum number.

It is in general the broad object of the present invention to provide an improved machine for the rapid pitting of fruit, particularly for the stoning of cherries.

The invention includes other objects and features of advantage some of which, together with the foregoing, will appear in the following description of the present preferred embodiment of the machine of my invention.

For simplicity, numerals applied herein with reference to parts of the apparatus and which appear in my aforesaid patent refer to the same structure.

In the drawing accompanying and forming a part hereof,

Figure 1 is an enlarged side elevation of the pitting mechanism and the carrier mechanism.

Figure 2 is a section taken along the lines of 2—2 of Figure 1.

The machine of the present invention includes a carrier structure generally indicated at 10 movable continuously past a presently described pitting mechanism. The machine also includes a suitable frame generally indicated at 16. The structure of the frame and of the carrier structure in relation thereto is fully disclosed in the aforementioned patent.

The fruit carrier structure 10 includes a plurality of individual fruit carriers 19, each fruit carrier having a plurality of fruit receptacles 24 therein in which the fruit is normally positioned with the dimple end of the fruit down. When a suitable pitting mechanism, such as is typified by knives 26, is lowered to engage the fruit, it cuts the fruit forcing the pit out through the stem or dimple end of the cherry and through passage 25 in the rubber fruit carrier 19.

In accordance with this invention I employ the relatively simple and light pitting operating mechanism disclosed in my aforementioned patent. To this end the frame 16 includes opposite parallel vertically extending side members 51 supported on frame 16 and joined together by member 52 and nuts 53 at the end of rods 54 to provide a support for the pitting operating mechanism. Between the side plates is a head or guide structure which includes horizontal parallel plates 55 secured together in a spaced parallel relation as by spacers 56. Each plate carries a V block 58 at opposite sides thereof engaged with V rollers 59 mounted upon studs 61 on each side member. The V blocks and V rollers support the head structure provided by plates 55 for a reciprocating movement between the side members, toward and away from the carrier structure. This movement, and the means for effecting it, characterizes the present invention, as will be presently described in detail.

Means are provided for reciprocating the head structure provided by plates 55. This means includes a vertical shaft 62 slidably journalled in suitable bearings 63 in the plates 55. Mounted upon the shaft and carried thereby is an eccentric follower 64 within which is an eccentric 66 rotated by shaft 39. Shaft 39 is rotated by suitable drive mechanism as disclosed in detail in my aforementioned patent. Upon rotation of shaft 39, eccentric 66 is effective to reciprocate the head structure provided by plates 55 over its angular path as will be presently described in detail.

Referring to the V blocks 58, it is to be noted that each of these blocks includes an angularly formed V section 100 which is in engagement with the associated supporting V roller. In the structure disclosed in the aforementioned patent the configuration of the V blocks 58 were such that the head in its reciprocatory movement only moved in one plane, that is, horizontally. By positioning the V block surfaces so that the head reciprocates toward and away from the carrier, several unexpected but highly advantageous results are accomplished. In the first place, the movement of the pitting mechanism necessary to a pitting operation is reduced because the pitting mechanism is moved that much closer to the fruit to be pitted. At the same time the speed of the pitting operation can be materially increased because, by moving the pitting mechanism toward the fruit to be pitted without actual energization thereof, any lost motion in the pitting mechanism is taken up so that, upon actual operation of the pitting mechanism, the knives can move in to pit the fruit very quickly.

The angle of the faces 100 on the V blocks 58 is preferably made as steep as possible. I have operated with faces having an angularity of 20° to the horizontal with success but this angle can be made more or less and I have operated with an angle as small as 2½° though I prefer more.

The means provided on the head structure for operating a pitting mechanism corresponds to that disclosed in my prior patent. This means includes two plungers 71 suitably journalled in bearings 72 on plates 55. Mounted upon one of the rods 54 are fixed arms 74 which extend to provide a support for spaced levers 76. Between the levers 76 is mounted a cam follower 77. The extending end of each lever 76 is slotted as at 78 to engage a roller 79 carried upon each plunger 71. Cam follower 77 is maintained in engagement with a cam 81 carried on shaft 39, spring 82 engages pad 80, which joins the levers 76, the spring urging levers 76 clockwise in Figure 1 so that the cam follower engages the cam at all times.

Extended between the plungers is a plate 91 carrying a plurality of fruit cutting mechanisms typically shown as the star-shaped knives 26. These knives are arranged in rows across the plate 91 so that a plurality of successive carriers are pitted at one time.

To facilitate operation, a cleaning plate 93 is yieldably secured to plate 91 by bolt 94, springs 96 urging the plate 93 away from the plate 91. The pitting knives are advanced through suitable apertures in the cleaning plate 93 to engage fruit upon the carriers beneath, extensions 95 on plate 93 engaging the carriers and moving with them. When the fruit has been pitted, the pits being forced through aperture 25 in the carriers, the knives are withdrawn, being cleaned by the plate 93 as they return.

In practice, the present machine will pit fruit as fast as it can be placed upon the carriers and fed into position by the operation of my automatic straightener means. This is at a considerably increased rate over that contemplated by the hand operation of my prior patent.

I claim:

1. In a machine of the character described, a continuous fruit carrier movable over a path at a substantially constant rate of advance, pitting mechanism normally positioned over said carrier, means supporting said pitting mechanism for movement, means for moving said support means with said pitting mechanism positioned over said carrier both in the direction of advance of said carrier and downwardly toward said carrier, and means for moving said pitting mechanism relative to said support means to pit fruit on said carrier when said support means has been moved down toward said carrier.

2. In a machine of the character described, a continuous fruit carrier movable over a path at a substantially constant rate of advance, pitting mechanism, guide means supporting said pitting mechanism for pitting movement toward and away from fruit on said carrier, means for moving said guide means both in the direction of advance of said carrier and toward said carrier, and means for moving said pitting mechanism to pit fruit on said carrier while said guide means is moving toward said carrier.

3. A fruit pitting mechanism comprising a succession of carriers movable at a substantially constant rate of advance over a path including a substantially horizontal portion of substantial length; pitting mechanism mounted over said carriers and above said horizontal portion and movable to engage and pit fruit on said carriers; a generally vertical guideway supported to move to and fro above said horizontal portion over a path parallel to that of said carriers; said pitting mechanism being slidably mounted in said guideway; means for advancing said guideway both in the direction of advance of said carriers and toward said carriers to maintain said pitting mechanism for a predetermined time interval superimposed over a carrier and in an approaching relation thereto, and means for lowering said pitting mechanism in said guideway during said interval to engage and pit fruit on said carrier and for raising said pitting mechanism from engagement with said fruit.

4. In a machine of the character described, a continuous fruit carrier movable over a path at a substantially constant rate of advance, pitting mechanism movable to pit fruit on said carrier, support means for said pitting mechanism, means for moving said support means to and fro over a path overlying the path of said carrier and converging therewith, and means for moving said pitting mechanism to pit fruit on said carrier during movement of said support means toward said carrier.

5. A fruit pitting mechanism comprising a succession of carriers movable at a substantially constant rate of advance over a path including a substantially horizontal portion of substantial length, pitting mechanism, a head structure, means mounting said pitting mechanism for a reciprocable vertical movement in said head, means supporting said head for reciprocation above at least a portion of said horizontal portion of said carrier and toward and away from said carrier, a shaft, an eccentric on said shaft for advancing said head upon rotation of said shaft, to maintain said pitting mechanism superimposed over a carrier over a portion of said path, and a cam on said shaft for forcing said pitting mechanism down during advance of said head toward said carrier to pit fruit on a carrier beneath the superimposed pitting mechanism.

6. In a machine of the character described, a pair of opposite side members extending vertically, a pair of horizontal spaced parallel plates, means joining said plates together to provide a unitary head structure, means supporting said head structure for a reciprocating movement between said side members in a plane at an angle to the horizontal, a continuous fruit carrier movable over a path including a substantially horizontal portion extending between said side members and below said plates, means for advancing said carrier substantially continuously, a plunger movable up and down in said plates, pitting mechanism on said plunger effective to pit fruit on said carrier, an eccentric carried by said head structure, a shaft for rotating said eccentric to reciprocate said head, a cam on said shaft, a lever hinged at one end on said side members and slidably engaged with said plunger at the other end, and a cam follower carried by said lever in engagement with said cam.

GEORGE W. ASHLOCK, Jr.